United States Patent
Hahn et al.

(10) Patent No.: US 8,686,071 B2
(45) Date of Patent: Apr. 1, 2014

(54) RUBBER COMPOSITION, PREPARATION AND TIRE WITH COMPONENT

(75) Inventors: Bruce Raymond Hahn, Hudson, OH (US); John Eugene Varner, Norton, OH (US); James Edward Taucher, Uniontown, OH (US); Byoung Jo Lee, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 47 days.

(21) Appl. No.: 13/156,663

(22) Filed: Jun. 9, 2011

(65) Prior Publication Data

US 2012/0000584 A1  Jan. 5, 2012

Related U.S. Application Data

(60) Provisional application No. 61/360,519, filed on Jul. 1, 2010.

(51) Int. Cl.
| | |
|---|---|
| *C08K 5/3432* | (2006.01) |
| *C08K 5/3477* | (2006.01) |
| *C08K 3/04* | (2006.01) |
| *C08K 3/36* | (2006.01) |
| *C08L 9/00* | (2006.01) |
| *C08L 7/00* | (2006.01) |
| *C08L 61/10* | (2006.01) |
| *C08L 61/14* | (2006.01) |

(52) U.S. Cl.
CPC ............. *C08K 5/3432* (2013.01); *C08K 5/3477* (2013.01); *C08K 3/04* (2013.01); *C08K 3/36* (2013.01); *C08L 9/00* (2013.01); *C08L 7/00* (2013.01); *C08L 61/14* (2013.01)
USPC ................................. 524/99; 524/89; 525/152

(58) Field of Classification Search
CPC ...................................................... C08K 5/3432
USPC ...................................... 524/89, 99; 525/132
See application file for complete search history.

(56) References Cited

U.S. PATENT DOCUMENTS

| | | | | |
|---|---|---|---|---|
| 3,334,103 | A | | 8/1967 | Feldman et al. .............. 260/290 |
| 5,580,513 | A | * | 12/1996 | Patitsas et al. ................ 264/501 |
| 6,084,015 | A | * | 7/2000 | Chino et al. .................. 524/189 |
| 6,194,509 | B1 | * | 2/2001 | Lin et al. ....................... 524/493 |
| 6,376,587 | B1 | * | 4/2002 | Ajiro et al. .................... 524/252 |
| 2008/0051496 | A1 | | 2/2008 | Debaud et al. ................ 524/236 |
| 2008/0085973 | A1 | | 4/2008 | Esseghir et al. .............. 524/718 |
| 2009/0069469 | A1 | | 3/2009 | Esseghir et al. ................ 524/99 |

FOREIGN PATENT DOCUMENTS

JP       2002338739 A  * 11/2002

OTHER PUBLICATIONS

Machine translated English equivalent of JP 2002-338739 (Nov. 2002, 8 pages).*
Kraton (Cariflex: Preparation of synthetic polyisoprene latex and its use in coagulant dipping. Kraton. Aug. 21, 2012).*

* cited by examiner

*Primary Examiner* — Brieann R Fink
(74) *Attorney, Agent, or Firm* — Henry C. Young, Jr.

(57) ABSTRACT

The invention relates to a cured rubber composition, its preparation and a tire with a component of such rubber composition. A reinforcing resin is used to promote stiffness for the cured rubber composition. The elastomer for the rubber composition is primarily comprised of at least one isoprene-containing elastomer.

20 Claims, No Drawings

RUBBER COMPOSITION, PREPARATION AND TIRE WITH COMPONENT

The Applicants hereby claim the benefit of prior U.S. Provisional Application Ser. No. 61/360,519, filed Jul. 1, 2010.

FIELD OF THE INVENTION

The invention relates to a cured rubber composition, its preparation and a tire with a component of such rubber composition. A reinforcing resin is used to promote stiffness for the cured rubber composition. The elastomer for the rubber composition is primarily comprised of at least one isoprene-containing elastomer.

BACKGROUND OF THE INVENTION

Stiff cured rubber compositions are often used for various tire components. For example, various rubber compositions are often used as internal sidewall components for promoting stiffness for tire sidewalls to enhance tire handling and cornering stability.

For this invention, the cured rubber component stiffness is promoted by an inclusion of a reinforcing resin as well as one or more relatively high viscosity elastomers in the rubber composition.

A problem with providing such stiff cured rubber composition is that, in its uncured state, it is relatively difficult to process such as, for example, by extrusion, particularly where a reinforcing, rubber stiffness promoting, resin is mixed with the already viscous uncured rubber composition.

Accordingly, it is desired to evaluate whether an improvement of the processing of the uncured rubber composition may be accomplished.

Historically, 4-hydroxyTEMPO, namely 2,2,6,6-tetramethylpiperidine-1,4-diol, has been used as a free radical scavenger and in various rubber compositions. For example, see U.S. Pat. Nos. 3,334,103; 6,084,015; and 6,194,509; U.S. Patent Application Nos. 2008/0051496, 2008/0085973, and 2009/0069469 as well as literature references "Mechanisms of Antioxidant Action", L. P. Nethsinghe, et al, University of Aston in Birmingham, England, received Jan. 15, 1984, (*Rubber Chemistry and Technology*, Volume 57, Pages 779 through 791); "Mechanisms of Antioxidant Action", H. S. Dweik, et al, University of Aston in Birmingham, England, received Dec. 2, 1983, (*Rubber Chemistry and Technology*, Volume 57, Pages 908 through 917); "Mechanisms of Antioxidant Action" H. S. Scott, et al, received Apr. 20, 1983 (*Rubber Chemistry and Technology*, Volume 57, Pages 735 through 743).

For this evaluation, the 4-hydroxy TEMPO is blended with the rubber composition prior to addition of the reinforcing resin.

Further, for this evaluation, it is required that the elastomer(s) of the rubber composition be primarily composed of isoprene-containing elastomers in a sense that the isoprene repeat unit is in the backbone of the elastomer either as a homopolymer of isoprene or as a copolymer of isoprene with other monomer comprised of, for example, at least one of butadiene and styrene.

As will be observed, it was discovered that blending of the 4-hydroxyTEMPO in the rubber composition followed by a subsequent blending of the reinforcing resin enabled a rubber composition containing a diene-based elastomer, particularly an isoprene-containing elastomer, which has a unique combination of low processing viscosity for the uncured rubber composition and a high cured stiffness for the sulfur vulcanized rubber composition.

While the mechanism may not be entirely understood, it appears that the radicals formed during high shear mixing of the rubber composition due to polymer chain scission in the isoprene-containing elastomer have an ability to combine with the stable free radical that is present in the 4-hydroxyTEMPO. It is known that the radical formed at the isoprene repeat unit in the elastomer during the high shear mixing of the rubber composition is longer lived (has a longer life) than similar radicals formed for butadiene repeat units. It is therefore envisioned that the combination of the isoprene radical and 4-hydroxyTEMPO radical results in a stabilization of the shorter elastomer chains which had been formed during the high shear mixing process due to chain scission.

However, it has been observed that when the reinforcing resin, namely a phenol formaldehyde resin, is added together with the 4-hydroxyTEMPO, instead of subsequent to the 4-hydroxyTEMPO addition, to the rubber composition containing the isoprene-containing elastomer for the high shear rubber mixing, the resulting uncured rubber composition still exhibited a high viscosity similar to the relatively high viscosity caused by the introduction of the phenol formaldehyde resin without the 4-hydroxyTEMPO, indicating that the presence of the 4-hydroxyTEMPO made little difference in the Mooney viscosity of the phenol formaldehyde-containing rubber composition. This continued high viscosity of the rubber composition may be due to the phenolic groups of the phenol formaldehyde combining with the stable free radical of the 4-hydroxyTEMPO, thus disabling their ability to combine with and stabilize the isoprene free radicals formed by the chain scission during the high shear mixing.

It is considered that this is the essence of, and a basis for, the significant discovery for this invention.

For this invention, then, it is proposed to provide a more easily processable uncured rubber composition (e.g. more easily extruded) which can provide a relatively stiff cured rubber composition, for example, for tire components such as, for example, tire sidewall stiffening components. Such sidewall components may be, for example, a sidewall apex or a tire sidewall insert.

Accordingly, an evaluation is proposed for an inclusion of a free radical absorbing compound such as, for example, 4-hydroxytempo (or, 2,2,6,6-tetramethylpiperidine-1,4-diol) to stabilize free radicals formed during by cleavage of portions of a diene-based elastomer during high shear mixing of an uncured diene-based elastomer in a rubber composition which contains reinforcing filler selected from at least one of rubber reinforcing carbon black and amorphous silica such as, for example precipitated silica.

For this evaluation, the elastomers are isoprene-containing elastomers because, as earlier discussed, the radicals formed on the isoprene repeat units during the high shear mixing of the rubber composition have a longer lifetime than radicals formed from butadiene or styrene units. This longer lifetime is envisioned to allow more time for the radicals of the isoprene unit and the stable free radical 4-hydroxyTEMPO to beneficially combine to promote a reduction in the Mooney viscosity of the rubber composition.

Representative of such isoprene-containing elastomers are, for example, cis 1,4-polyisoprene rubber (natural and synthetic), isoprene/butadiene copolymer elastomers, styrene/isoprene/butadiene terpolymer elastomers and 3,4-polyisoprene elastomers.

The rubber composition with such stabilized created free radicals is intended to promote a lower rubber viscosity for the uncured rubber having been mixed under free radical generating high shear conditions to therefore the uncured rubber more easily processable such as by extrusion of the rubber composition.

It is then proposed to evaluate an addition of one or more phenol formaldehyde resins to such uncured rubber composition, subsequent to such free radical generation 4-hydroxytempo stabilization treatment, to promote stiffness for the ultimately cured rubber composition such as, for example, a phenol formaldehyde resin, particularly a pre-formed phenol formaldehyde resin, for which the aforesaid lower viscosity uncured 4-hydroxytempo treated rubber composition may be able to tolerate such resin addition in a sense that the uncured rubber composition might be of a suitable viscosity that it is easily processable such as by extrusion.

Accordingly, it is an aspect of this invention to undertake such evaluation.

In the description of this invention, the terms "rubber" and "elastomer" may be used interchangeably unless otherwise indicated. The terms "rubber composition", "compounded rubber" and "rubber compound", may be used interchangeably to refer to "rubber which has been blended or mixed with various ingredients" and the term "compound" relates to a "rubber composition" unless otherwise indicated. Such terms are well known to those having skill in the rubber mixing or rubber compounding art.

In the description of this invention, the term "phr" refers to parts of a respective material per 100 parts by weight of rubber, or elastomer. The terms "cure" and "vulcanize" may be used interchangeably unless otherwise indicated. The term "Tg", if used, means the middle point glass transition temperature of an elastomer determined by DSC (differential scanning calorimeter) at a heating rate of 10° C. per minute as would be understood by those having skill in such art.

SUMMARY AND PRACTICE OF THE INVENTION

In accordance with this invention a method of preparing a rubber composition comprises:
(A) high shear mixing of a rubber composition comprised of at least one sulfur curable isoprene-containing elastomer and rubber reinforcing filler comprised of at least one of carbon black and precipitated silica in the presence of 4-hydroxyTEMPO, and subsequently:
(B) blending therewith a pre-formed phenol formaldehyde rubber reinforcing resin, and thereafter
(C) blending sulfur curatives and optionally hexamethylenetetramine crosslinking agent for said pre-formed phenol formaldehyde resin.

In one embodiment, said method of preparing a rubber composition comprises:
(A) mixing in at least one mixing stage, (to a temperature in a range of from about 140° C. to about 180° C.), a rubber composition comprised of:
  (1) 100 phr of at least one conjugated diene-based elastomer comprised of:
    (a) 100 phr of at least one isoprene-containing elastomer, or
    (b) elastomers comprised of:
      (i) about 10 to about 90 phr of at least one isoprene-containing elastomer, and
      (ii) about 90 to about 10 phr of at least one additional conjugated diene-based elastomer (other than an isoprene-containing elastomer),
  (2) from about 25 to about 110, alternately from about 45 to about 110 phr of rubber reinforcing filler comprised of:
    (a) rubber reinforcing carbon black,
    (b) synthetic amorphous silica (e.g. precipitated silica), or
    (c) combination of rubber reinforcing carbon black and precipitated silica (for example, containing from about 10 to about 60 phr of precipitated silica); and
  (3) silica coupler for said precipitated silica (when precipitated silica is used for the reinforcing filler) having a moiety reactive with hydroxyl groups (e.g. silanol groups) on said silica and another different moiety interactive with said diene-based elastomer(s), and
  (4) 4-hydroxyTEMPO;
(B) subsequently blending therewith, desirably in a subsequent mixing stage, (to a temperature in a range of, for example, from about 130° C. to about 180° C., more normally in a range of from about 140° C. to about 180° C.) a pre-formed phenol formaldehyde rubber reinforcing resin (e.g. in an amount of from about 3 to about 30, alternately from about 3 to about 20, phr), and thereafter
(C) blending therewith, in a subsequent mixing stage, (to a temperature in a range of from about 90° C. to about 120° C.), sulfur curatives and optionally hexamethylenetetramine crosslinking agent, for said pre-formed phenol formaldehyde resin.

In practice, the rubber composition is cooled to below 40° C. between each of said mixing stages.

Historically, phenol formaldehyde resins are very complex thermoplastic resins formed by reaction of phenol with formaldehyde. When the phenol is reacted with formaldehyde, for example in an aqueous solution, and in the presence of an acid catalyst with a molar excess of the phenol, the formaldehyde may react with any of three ortho and para sites on the phenol to thereby form a very complex mixture of polymers of different structures of seemingly random orientations with some branching occurring. Such resins are often referred to as "Novolac" resins. The resin is usually in a form of a mixture of oligomers of relatively low molecular weights. Such phenol formaldehyde resins are believed to be well known to those having skill in such art.

For this invention, the phenol formaldehyde resin is provided as a pre-formed phenol formaldehyde resin in the sense of being pre-formed prior to its addition to the rubber composition instead of being formed in situ within the rubber composition.

The source of phenol for preparation of the phenol formaldehyde resin, particularly a Novolac resin, may be various compounds, such as for example, cashew nut shell oil as well as phenol, alkylated phenols, cresols and resorcinol. Such compounds are well known for use in preparation of phenol formaldehyde resins.

A crosslinking agent may be provided for the Novolak phenol formaldehyde such as, for example, hexamethylenetramine which is sometimes referred to as HMTA, which provides a source of formaldehyde to react and crosslink the pre-formed phenol formaldehyde resin when heated to an elevated temperature.

In one embodiment, said sulfur curable isoprene-containing elastomer is natural cis 1,4-polyisoprene rubber.

In further accordance with this invention, a rubber composition prepared by such method is provided.

In additional accordance with this invention such rubber composition is provided as a sulfur cured rubber composition.

In further accordance with this invention, a tire is provided having at least one component comprised of said rubber composition.

To promote tire handling and stability, such tire component may comprise, for example, an internal tire sidewall insert such as example, a tread apex, an internal sidewall stiffing component spaced apart from a tire sidewall apex and/or an internal tire shoulder component, sometimes referred to as a shoulder wedge.

Representative of sulfur curatives are, for example, sulfur and sulfur vulcanization accelerators which may optionally also contain a sulfur vulcanization retarder. Such sulfur curatives for diene-based elastomer containing rubber compositions are well known to those having skill in such art.

In one embodiment, the rubber composition is comprised of, based upon parts by weight per 100 parts by weight rubber (phr):

(A) 100 phr of at least one conjugated diene-based elastomer comprised of:
  (1) 100 phr of at least one isoprene-containing elastomer, or
  (2) elastomers comprised of:
    (a) about 10 to about 90 phr of at least one isoprene-containing elastomer, and
    (b) about 90 to about 10 phr of at least one additional conjugated diene-based elastomer (other than an isoprene-containing elastomer),
(B) from about 25 to about 110, alternately from about 45 to about 110, phr of rubber reinforcing filler comprised of:
  (1) rubber reinforcing carbon black,
  (2) synthetic amorphous silica (e.g. precipitated silica), or
  (3) combination of rubber reinforcing carbon black and precipitated silica (for example, containing from about 10 to about 60 phr of precipitated silica);
(C) silica coupler for said precipitated silica (when precipitated silica is used for the reinforcing filler) having a moiety reactive with hydroxyl groups (e.g. silanol groups) on said silica and another different moiety interactive with said diene-based elastomer(s), and
(D) pre-formed phenol formaldehyde rubber reinforcing resin (e.g. in an amount of from about 3 to about 30, alternately from about 3 to about 20, phr), particularly where the addition of the pre-formed phenol formaldehyde is delayed until after addition of the 4-hydroxyTEMPO.

The pre-formed phenol formaldehyde resin may be, if desired, cross-linked in situ within the rubber composition with hexamethylenetetramine.

A significant aspect of the invention appears to be that the delayed addition of the phenol formaldehyde resin until after the addition and mixing of the 4-hydroxyTEMPO, with the rubber composition appears to be synergistic in nature in a sense that the delayed addition of the phenol formaldehyde resin not only tends to avoid a pre-reaction of the phenol moiety with the 4-hydroxyTEMPO but also reduces the time of mixing of the phenol formaldehyde resin with the rubber under the high shear mixing conditions and thereby reduced, and possibly avoids, a breakdown of the phenol formaldehyde resin associated with high shear mixing, particularly at an elevated mixing temperature. This is believed to promote the higher stiffness values obtained for the cured rubber composition, namely by allowing the phenol formaldehyde to thereby more effectively promote its reinforcing effect for the rubber composition.

The precipitated silica is normally used in combination with a coupling agent (silica coupling agent) having a moiety reactive with hydroxyl groups contained on the surface of the silica (e.g. silanol groups) and another moiety interactive with said diene-based elastomers.

A coupling agent for such silica may, for example, be a bis(3-trialkoxysilylalkyl) polysulfide which contains an average of from 2 to 4, alternately an average of from 2 to about 2.6 or an average of from about 3.4 to about 3.8, connecting sulfur atoms in its polysulfidic bridge. Representative of such coupling agent is for example, bis(3-triethoxysilylpropyl) polysulfide as being, for example, comprised of a bis(3-triethoxysilylpropyl) tetrasulfide, namely with the polysulfidic bridge comprised of an average of from about 3.2 to about 3.8 connecting sulfur atoms or a bis(3-triethoxysilylpropyl) disulfide with the polysulfidic bridge comprised of an average of from about 2.1 to about 2.6 connecting sulfur atoms.

Alternately, such coupling agent may be an organomercaptosilane (e.g. an alkoxyorganomercaptosilane), and particularly an alkoxyorganomercaptosilane having its mercapto function reversibly capped. Various of such alkoxyorganomercaptosilane coupling agents are well known to those having skill in such art.

In practice, the synthetic amorphous silica may be selected from aggregates of precipitated silica, which is intended to include precipitated aluminosilicates as a co-precipitated silica and aluminum.

Such precipitated silica is, in general, well known to those having skill in such art. The precipitated silica aggregates may be prepared, for example, by an acidification of a soluble silicate, e.g., sodium silicate, in the presence of a suitable electrolyte and may include co-precipitated silica and a minor amount of aluminum.

Such silicas might have a BET surface area, as measured using nitrogen gas, such as, for example, in a range of about 40 to about 600, and more usually in a range of about 50 to about 300 square meters per gram. The BET method of measuring surface area is described in the *Journal of the American Chemical Society*, Volume 60 (1938).

The silica might also have a dibutylphthalate (DBP) absorption value in a range of, for example, about 50 to about 400 $cm^3/100$ g, alternately from about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210™, Hi-Sil 243™, etc; silicas from Rhodia as, for example, Zeosil 1165MP™ and Zeosil 165GR™, silicas from J. M. Huber Corporation as, for example, Zeopol 8745 and Zeopol 8715, silicas from Degussa AG with, for example, designations VN2™, VN3™ and Ultrasil 7005™ as well as other grades of precipitated silica.

Various rubber reinforcing carbon blacks might be used for the tread rubber compositions. Representative of various rubber reinforcing blacks may be referred to by their ASTM designations such as for example, although not intended to be limiting, N110, N121 and N234. Other rubber reinforcing carbon blacks may found, for example, in *The Vanderbilt Rubber Handbook* (1978), Page 417.

Representative of various isoprene-containing elastomers are, for example, cis 1,4-polyisoprene, styrene/isoprene/butadiene terpolymer elastomers and isoprene/butadiene copolymer elastomers. Natural cis 1,4-polyisoprene rubber is often desired.

Representative of various additional conjugated diene-based elastomers for the rubber composition are, for example, styrene-butadiene copolymers (prepared, for example, by organic solvent solution polymerization or by aqueous emulsion polymerization), and tin coupled elastomers comprised of organic solution polymerization prepared styrene/butadiene copolymers, cis 1,4-polyisoprene (including synthetic and natural cis 1,4-polyisoprene rubber) and cis 1,4-polybutadiene as well as trans 1,4-polybutadiene and high vinyl polybutadiene rubber.

A significant aspect of this invention, as previously mentioned, is the process of addition of the 4-hydroxyTEMPO to the rubber composition with the isoprene-containing elastomer(s) and subsequently adding a phenolic reinforcing resin such as the phenol formaldehyde resin.

This is considered herein to be significant in a sense that it has been observed that a rubber composition having a unique combination of relatively low processing viscosity for the rubber composition in its uncured state together with a relatively high stiffness for the rubber composition in its subsequently cured state can be obtained.

In practice, the rubber composition may be prepared in at least one preparatory (non-productive) mixing step in an internal rubber mixer, often a sequential series of at least two separate and individual preparatory internal rubber mixing steps, or stages, in which the diene-based elastomer is first mixed with the prescribed silica and/or carbon black as the case may be in the presence of the 4-hydroxyTEMPO.

In a final mixing step (productive mixing step) in an internal rubber mixer, curatives (sulfur and sulfur vulcanization accelerators) are blended at a lower temperature and for a substantially shorter period of time.

It is conventionally required after each internal rubber mixing step that the rubber mixture is actually removed from the rubber mixer and cooled to a temperature below 40° C., perhaps to a temperature in a range of about 20° C. to about 40° C. and then added back to an internal rubber mixer for the next sequential mixing step, or stage.

Such non-productive mixing, followed by productive mixing is well known by those having skill in such art.

The forming of a tire component is contemplated to be by conventional means such as, for example, by extrusion of rubber composition to provide a shaped, unvulcanized rubber component such as, for example, the a tire sidewall apex. Such forming of a tire sidewall apex is well known to those having skill in such art.

It is understood that the tire, as a manufactured article, is prepared by shaping and sulfur curing the assembly of its components at an elevated temperature (e.g. 140° C. to 170° C.) and elevated pressure in a suitable mold. Such practice is well known to those having skill in such art.

The following Example is provided to further understand the invention.

EXAMPLE I

Rubber compositions are prepared for evaluating an effect of high shear mixing of an isoprene-containing elastomer based rubber composition in the presence of a 4-hydroxyTEMPO followed by subsequent addition of a phenol formaldehyde resin.

For this example, a Control rubber Sample A is prepared which contains cis 1,4-polyisoprene rubber, a phenol formaldehyde resin without 4-hydroxyTEMPO.

Control rubber Sample B is also prepared which also considered as being a Control rubber composition which contains cis 1,4-polyisoprene elastomer and a phenol formaldehyde resin which is added in the second mixing stage, also without any addition of 4-hydroxyTEMPO.

Experimental rubber Compositions C through D were prepared which the 4-hydroxyTEMPO being added together with the phenol formaldehyde resin for rubber Composition C and prior the addition of the phenol formaldehyde resin for rubber Composition D, with the results for evaluative rubber Composition D being surprisingly dramatic as this Example demonstrates.

The rubber compositions are prepared by mixing the ingredients in sequential non-productive (NP) and productive (PR) mixing steps in one or more internal rubber mixers.

The basic recipe for the rubber Samples is presented in the following Table 1 and reported in parts by weight unless otherwise indicated.

TABLE 1

| First Non-Productive Mixing Step (NP1), (mixed to about 170° C.) | Parts |
|---|---|
| Natural cis 1,4-polyisoprene rubber[1] | 100 |
| 4-hydroxyTEMPO[2] | 1.5 and 0 |
| Carbon black (N326)[3] | 75 |
| Rubber processing oil and microcrystalline wax | 7 |
| Zinc oxide | 5 |
| Fatty acid[4] | 2 |
| Phenol-formaldehyde resin, pre-formed[5] | 20 and 0 |
| Second Non-Productive Mixing Step (NP2) | |
| Phenol-formaldehyde resin, pre-formed[5] | 20 and 0 |
| Productive Mixing Step (PR), (mixed to about 120° C.) | |
| Sulfur | 3 |
| Sulfur cure accelerators as sulfenamide and thiuram disulfide | 2.5 |
| Hexamethylenetriamine, a crosslinking agent for the pre-formed phenol formaldenhyde resin | 3 |

[1]Natural rubber as SMR-20
[2]4-hydroxyTEMPO obtained as 4-Hydroxy-TEMPO ™ from Evonic.
[3]Rubber reinforcing carbon black as N326, and ASTM designation.
[4]Fatty acid comprised of stearic acid, palmitic and oleic acid.
[5]Phenol formaldehyde based resin of the Novolac type obtained as Alnovol PN 320 R ™ from Hoechst Celanese company.

The following Table 2 illustrates cure behavior and various physical properties (values rounded) of rubber compositions, namely rubber Samples A through D, based upon the recipe of Table 1.

TABLE 2

| | Samples | | | |
|---|---|---|---|---|
| | Control | | Experimental | |
| Summary of Materials | A | B | C | D |
| First Non-Productive Stage Mixing (NP1) | | | | |
| Phenol formaldehyde resin | 20 | 0 | 20 | 0 |
| 4-hydroxyTEMPO | 0 | 0 | 1.5 | 1.5 |
| Second Non-Productive Stage Mixing (NP2) | | | | |
| Phenol formaldehyde resin | 0 | 20 | 0 | 20 |
| RPA[1], 100° C., 15% Strain, 0.833 Hz | | | | |
| Uncured rubber G' (KPa) | 226 | 330 | 234 | 238 |
| RPA[1], 100° C., 3% Strain, 1 Hz | | | | |
| Cured rubber G' (KPa) | 11.871 | 20.218 | 12.446 | 18.428 |
| Tan delta | 0.1 | 0.09 | 0.09 | 0.09 |
| Rheometer, 150° C. | | | | |
| Minimum torque (dNm) | 3 | 3.2 | 3.1 | 2.7 |
| Maximum torque (dNm) | 61 | 100 | 68 | 97 |
| Delta torque (dNm) | 58 | 96.5 | 64.9 | 94.3 |
| Stress-Strain[2] 30 min. @ 150° C. Cure | | | | |
| 100% modulus ring (MPa) | 7.6 | 8.5 | 7.5 | 8.1 |
| Tensile strength (MPa) | 13.6 | 12.8 | 12.3 | 12.6 |

[1]Data according to Rubber Process Analyzer as RPA 2000 ™ (Alpha Technologies company).
[2]ASTM D412-062(a)

It is desirable to prepare a rubber composition which approximates the cured stiffness of the phenol formaldehyde-containing Control rubber Sample B (rubber Composition B) of this Example, namely approximating its cured G' 20,218 kPa reported in Table 2, while also approximating the uncured stiffness of the non-phenol formaldehyde-containing Control rubber Sample A (rubber Composition A), namely approximating its uncured G' of 226 Kpa reported in Table 2.

In one aspect, it is desired to add the phenol formaldehyde later in the rubber mixing process to reduce its potential of breaking down by limiting its time of exposure to high shear mixing at an elevated temperature so that the contribution of the phenol formaldehyde resin to for stiffening the rubber composition may be promoted.

In summary:

It can be seen from Table 2 that:

(A) For Control rubber Sample B, an inclusion of the phenol formaldehyde resin (a delayed addition) into the basic rubber composition of Control rubber Sample A resulted in a desirably stiff cured rubber composition for Control rubber Sample B as indicated by its significantly increased cured G' value of 20,218 KPa as compared to the cured G' value of 11,871 KPa for Control rubber Sample A.

However, the uncured G' value for uncured Control rubber Sample B significantly increased by a factor of 46 percent to a value of 330 MPa, as compared to 226 MPa for Control rubber Sample A, which makes the processing of the Control rubber Sample B in its uncured state more difficult.

(B) It is further seen from Experimental rubber Sample C that adding 4-hydroxyTEMPO to the basic rubber composition of Control rubber Sample A, which contained the delayed inclusion of the phenol formaldehyde resin, had little effect on its uncured G' value, namely that it provided an uncured G' value of 234 as compared to the uncured G' value of 226 for Control rubber Sample A. This is considered herein to be somewhat of a surprise since it might be expected that the addition of the 4-hydroxyTEMPO would lower the G' value below the 234 KPa observed for Control rubber Sample A (C) Experimental rubber Sample D represents a surprising discovery. In particular, it was discovered as observed for Experimental rubber Sample D, that adding 4-hydroxyTEMPO to the rubber composition of Control rubber Sample B, for which the addition of the phenol formaldehyde resin was delayed, had a great effect of providing the uncured G' with a value of 238, a 38 percent reduction from the much higher uncured G' value of 330 for rubber Sample B and which therefore made its uncured G' value more comparable with the uncured G' of 226 for of Control rubber Sample A. This is a very significantly discovered processing advantage for Experimental rubber Sample D.

Interestingly, it is discovered, however, that the cured G' value for Experimental rubber Sample D, with the 4-hydroxyTEMPO addition, and delayed phenol formaldehyde addition, was reduced by about 9 percent to a cured G' value of 18,428 KPa as compared to the cured G' value of 20,218 KPa for rubber Sample B.

It is considered herein that Experimental rubber Sample D demonstrates a significant aspect of the invention in the sense that the addition of the 4-hydroxyTEMPO prior to the addition of the phenol formaldehyde resin is observed to allow the 4-hydroxyTEMPO to react with the rubber (e.g. the elastomer within the rubber composition, particularly with an isoprene-containing elastomer), namely with the free radicals formed during the high shear mixing, to reduce the rubber viscosity (Mooney viscosity) without chemical interference of the phenol formaldehyde with the 4-hydroxyTEMPO. The resulting lower viscosity rubber allows for a later addition of the rubber reinforcing phenol formaldehyde resin under reduced rubber viscosity conditions for easier and more efficient mixing of the rubber composition. Such process also beneficially reduces the time of exposure of the phenol formaldehyde resin to high shear mixing which promotes less opportunity for breakdown of the phenol formaldehyde resin itself and thereby presents the phenol formaldehyde resin in a better rubber reinforcing form.

This is considered herein to be significant in a sense that it demonstrates that a higher stiffness for the cured rubber composition can be obtained without a significant breakdown of the phenol formaldehyde resin during the preparatory rubber mixing process.

Indeed, it is considered that this phenomenon is best presented by rubber Sample D presented for which its preparation begins with a unique property of having a low uncured viscosity (namely its uncured G' value for this Example) prior to addition of the phenol formaldehyde resin. The low uncured viscosity, namely the low uncured G' value, is a indicator of an easier processing rubber composition and the eventual high cured stiffness of the rubber composition, namely the significantly higher cured G' value, is an indicator of improved tire handling properties for a tire with a sidewall insert of such rubber composition.

It can also be seen from Table 2 that the unique properties of low uncured viscosity and high cured stiffness is also indicated in the Rheometer data. The minimum torque value is lowest for Sample D and the maximum torque for Experimental rubber Sample D is equivalent to Control rubber Sample B and much higher than the values for rubber Samples A and C.

This aspect is considered herein to be significant in a sense of again demonstrating that Sample D has improved processing indicated by the low minimum torque and improved cured stiffness as indicated by the high maximum torque.

This demonstrates a feasibility and benefit of providing a rubber compound that can be relatively easily processed but still achieve a high level of cured stiffness with the addition of 4-hydroxyTEMPO in a mixing stage before the addition of the reinforcing resin.

This is further considered herein to be significant in the sense of indicating that the a breakdown of the reinforcing resin can be minimized by its delayed addition within the rubber mixer to which the addition of 4-hydroxyTEMPO is made prior to the addition of the reinforcing resin in a sense that with the promotion of the lower viscosity (lower uncured G'), lower internal heat buildup can be experienced during the mixing of the rubber composition within the rubber mixer, with less accompanying temperature rise for the rubber composition, not only allows for a rubber composition which has a lower viscosity for easier processing but also a much higher eventual cured rubber stiffness which is significant for improved tire performance such as vehicular tire handling performance.

While certain representative embodiments and details have been shown for the purpose of illustrating the subject invention, it will be apparent to those skilled in this art that various changes and modifications can be made therein without departing from the scope of the subject invention.

What is claimed is:

1. A method of preparing a rubber composition characterized by comprising:
(A) high shear mixing of a rubber composition comprised of at least one sulfur curable isoprene-containing elastomer and rubber reinforcing filler comprised of at least one of carbon black and precipitated silica in the presence of 4-hydroxy TEMPO, and subsequently:

(B) thereafter blending therewith a phenol formaldehyde rubber reinforcing resin to avoid pre-reaction with the 4-hydroxy TEMPO, and thereafter (C) blending sulfur curatives together with hexamethylenetetramine therewith wherein said isoprene-containing elastomer is selected from the group consisting of at least one of natural cis 1,4-polyisoprene rubber, synthetic cis 1,4-polyisoprene rubber, styrene/isoprene/butadiene rubber and isoprene/butadiene rubber, and wherein said phenol formaldehyde resin is a preformed product of formaldehyde and phenol providing compound wherein said phenol providing compound is comprised of at least one of cashew nut shell oil, phenol, alkylated phenol, cresol and resorcinol.

2. The method of claim 1 wherein said isoprene-containing elastomer is said cis 1,4-polyisoprene rubber and wherein said phenol formaldehyde resin is crosslinked in situ within the rubber composition with said hexamethylenetetramine.

3. The method of claim 1 wherein said rubber composition contains from about 10 to about 90 weight percent of isoprene-containing elastomer consisting of cis 1,4-polyisoprene rubber and, correspondingly, from about 90 to about 10 weight percent of additional elastomer consisting of at least one of cis 1,4-polybutadiene elastomer, trans 1,4-polybutadiene elastomer, styrene/butadiene elastomer, including aqueous emulsion polymerized styrene and 1,3-butadiene monomers and organic solution polymerized styrene and 1,3-butadiene monomers.

4. The method of claim 1 wherein said sulfur curable isoprene-containing elastomer is natural cis 1,4-polyisoprene elastomer.

5. The method of claim 1 wherein said method of preparing a rubber composition comprises:

(A) mixing in at least one mixing stage, a rubber composition comprised of:

(1) about 100 phr of at least one conjugated diene-based elastomer consisting of:

(a) 100 phr of said cis 1,4-polyisoprene elastomer, or (b) elastomers comprised consisting of:

(i) from about 10 to about 90 phr of said cis 1,4-polyisoprene rubber, and (ii) from about 90 to about 10 phr of at least one additional conjugated diene-based elastomer, other than said cis 1,4-polyisoprene elastomer consisting of at least one of cis 1,4-polybutadiene elastomer, trans 1,4-polybutadiene elastomer, styrene/butadiene elastomer, including aqueous emulsion polymerized styrene and 1,3-butadiene monomers and organic solution polymerized styrene and 1,3-butadiene monomers, (2) from about 25 to about 110 phr of rubber reinforcing filler comprised of:

(a) rubber reinforcing carbon black, (b) precipitated silica, or (c) combination of rubber reinforcing carbon black and precipitated silica; and (3) silica coupler for said precipitated silica, when precipitated silica is used for the reinforcing filler, having a moiety reactive with hydroxyl groups on said silica and another different moiety interactive with said diene-based elastomer(s), and (4) 4-hydroxy TEMPO;

(B) subsequently blending therewith about 3 to about 30 phr, of said pre-formed phenol formaldehyde rubber reinforcing resin, and (C) thereafter blending therewith, in a subsequent mixing stage, sulfur curatives together with hexamethylenetetramine crosslinking agent for said pre-formed phenol formaldehyde resin.

6. A rubber composition prepared by the method of claim 1.

7. A rubber composition prepared by the method of claim 2.

8. A rubber composition prepared by the method of claim 5.

9. The rubber composition of claim 6 provided as a sulfur cured rubber composition containing said phenol formaldehyde resin crosslinked with said hexamethylenetetramine.

10. A tire having at least one component comprised of the rubber composition of claim 9.

11. The tire of claim 10 wherein said component is at least one of an internal tire sidewall insert as an apex, an internal tire sidewall insert positioned within the tire sidewall and spaced apart from its apex, and an internal tire shoulder component as a shoulder wedge.

12. A rubber composition prepared by the method of claim 4.

13. The rubber composition of claim 7 provided as a sulfur cured rubber composition containing said phenol formaldehyde resin crosslinked with said hexamethylenetetramine.

14. The rubber composition of claim 8 provided as a sulfur cured rubber composition containing said phenol formaldehyde resin crosslinked with said hexamethylenetetramine.

15. A tire having at least one component comprised of the rubber composition of claim 14.

16. A tire having at least one component comprised of the rubber composition of claim 12.

17. A tire having at least one component comprised of the rubber composition of claim 13.

18. The tire of claim 15 wherein said component is at least one of an internal tire sidewall insert as an apex, an internal tire sidewall insert positioned within the tire sidewall and spaced apart from its apex, and an internal tire shoulder component as a shoulder wedge.

19. The tire of claim 16 wherein said component is at least one of an internal tire sidewall insert as an apex, an internal tire sidewall insert positioned within the tire sidewall and spaced apart from its apex, and an internal tire shoulder component as a shoulder wedge.

20. The tire of claim 17 wherein said component is at least one of an internal tire sidewall insert as an apex, an internal tire sidewall insert positioned within the tire sidewall and spaced apart from its apex, and an internal tire shoulder component as a shoulder wedge.

\* \* \* \* \*